(12) United States Patent  
Shafer et al.

(10) Patent No.: US 6,973,921 B2  
(45) Date of Patent: Dec. 13, 2005

(54) FUEL PUMPING SYSTEM AND METHOD

(75) Inventors: Scott F. Shafer, Morton, IL (US); Lifeng Wang, Normal, IL (US)

(73) Assignee: Caterpillar Inc., Peoria, IL (US)

( * ) Notice: Subject to any disclaimer, the term of this patent is extended or adjusted under 35 U.S.C. 154(b) by 65 days.

(21) Appl. No.: 10/733,444

(22) Filed: Dec. 12, 2003

(65) Prior Publication Data

US 2005/0126545 A1 Jun. 16, 2005

(51) Int. Cl.[7] .......................................... F02M 37/04
(52) U.S. Cl. ..................... 123/495; 123/456; 123/457
(58) Field of Search ........................... 123/446, 447, 123/456, 457, 458, 495, 500–504

(56) References Cited

U.S. PATENT DOCUMENTS

| | | | |
|---|---|---|---|
| 3,000,319 A | | 9/1961 | Tuck .......................... 417/270 |
| 3,105,441 A | | 10/1963 | Grill et al. ................... 417/216 |
| 4,083,345 A | | 4/1978 | Davis ......................... 123/366 |
| 5,094,216 A | * | 3/1992 | Miyaki et al. ............... 123/506 |
| 5,277,156 A | * | 1/1994 | Osuka et al. .......... 123/198 DB |
| 5,404,855 A | * | 4/1995 | Yen et al. ..................... 123/446 |
| 5,441,027 A | * | 8/1995 | Buchanon et al. ........... 123/446 |
| 5,460,133 A | * | 10/1995 | Perr et al. .................... 123/446 |
| 5,603,303 A | * | 2/1997 | Okajima et al. ............. 123/508 |
| 5,983,863 A | * | 11/1999 | Cavanagh et al. ........... 123/447 |
| 6,253,735 B1 | | 7/2001 | Miyajima .................... 123/456 |

* cited by examiner

*Primary Examiner*—Weilun Lo  
(74) *Attorney, Agent, or Firm*—Finnegan, Henderson, Farabow, Garrett & Dunner LLP

(57) ABSTRACT

A fuel pumping system that includes a pump drive is provided. A first pumping element is operatively connected to the pump drive and is operable to generate a first flow of pressurized fuel. A second pumping element is operatively connected to the pump drive and is operable to generate a second flow of pressurized fuel. A first solenoid is operatively connected to the first pumping element and is operable to vary at least one of a fuel pressure and a fuel flow rate of the first flow of pressurized fuel. A second solenoid is operatively connected to the second pumping element and is operable to vary at least one of a fuel pressure and a fuel flow rate of the second flow of pressurized fuel.

12 Claims, 4 Drawing Sheets

FUEL PUMPING SYSTEM AND METHOD

U.S. GOVERNMENT RIGHTS

This invention was made with government support under the terms of Contract No. DE-FC05-00OR22806 awarded by the Department of Energy. The government may have certain rights in this invention.

TECHNICAL FIELD

The present invention is directed to a fuel system and, more particularly, to a fuel pumping system and method.

BACKGROUND

The operation of an internal combustion engine such as, for example, a diesel, gasoline, or natural gas engine, may cause the generation of undesirable emissions. These emissions, which may include particulates and oxides of nitrogen (NOx), are generated when fuel is combusted in a combustion chamber of the engine. An exhaust stroke of an engine piston forces exhaust gas, which may include these emissions, from the engine. If no emission reduction measures are in place, these undesirable emissions will eventually be exhausted to the environment.

Research is currently being directed towards decreasing the amount of undesirable emissions that are exhausted to the environment during the operation of an engine. It is expected that improved engine design and improved control over engine operation may lead to a reduction in the generation of undesirable emissions. Many different approaches such as, for example, exhaust after-treatments, have been found to reduce the amount of emissions generated during the operation of an engine. The use of exhaust aftertreatments requires periodic regeneration of the aftertreatment systems. Aftertreatment regeneration may require incremental fueling in the form of late post injections, which require additional capacity of the fuel delivery system.

Another method of reducing undesirable emissions involves improving the combustion characteristics of the engine. This may be accomplished, for example, by implementing homogeneous charge compression ignition (HCCI) in the engine. In a HCCI engine, fuel enters the engine with the intake air prior to or at the start of the compression stroke and both the intake air and fuel are heated in the compression stroke. HCCI operation requires precise control over fuel flow and fuel delivery pressure. For example, HCCI may require early fuel injection timing and a reduced fuel injection pressure that limits spray penetration during the associated relatively low cylinder air densities.

The fuel flows and pressures required to efficiently run low emission engines utilizing after-treatment solutions and/or HCCI may vary greatly. In order to ensure that a sufficient supply of fuel at a sufficient pressure is always available to fulfill the demands of the engine, the fuel delivery system should be capable of supplying the largest anticipated quantity of fuel at the highest anticipated pressure that could be demanded. Unfortunately, this design approach typically results in a fuel system that is over designed for typical engine operation and may, therefore, be inefficient for the majority of the engine's operation.

As described in U.S. Pat. No. 6,253,735 to Miyajima et al., issued on Jul. 3, 2001, a fuel system may include multiple, selectively actuated fuel pumps that are operable to deliver an increased fuel flow rate when demanded. When the demand for fuel is low, one of the fuel pumps may be deactivated, thereby reducing the load on the engine and increasing engine efficiency. However, the fuel system described in the '735 patent to Miyajima et al., which includes multiple pumps, regulators, valving arrangements, and controllers, may be overly complex and costly.

The fuel pumping system of the present invention solves one or more of the problems set forth above.

SUMMARY OF THE INVENTION

One aspect of the present disclosure is directed to a fuel pumping system that includes a pump drive. A first pumping element is operatively connected to the pump drive and is operable to generate a first flow of pressurized fuel. A second pumping element is operatively connected to the pump drive and is operable to generate a second flow of pressurized fuel. A first solenoid is operatively connected to the first pumping element and is operable to vary at least one of a fuel pressure and a fuel flow rate of the first flow of pressurized fuel. A second solenoid is operatively connected to the second pumping element and is operable to vary at least one of a fuel pressure and a fuel flow rate of the second flow of pressurized fuel.

Another aspect of the present disclosure is directed to a method of controlling a fuel system. A first pumping element is operated to produce a first flow of pressurized fuel. A second pumping element is operated to produce a second flow of pressurized fuel. A first solenoid is selectively energized to vary at least one of a fuel pressure and a fuel flow rate of the first flow of pressurized fuel. A second solenoid is selectively energized to vary at least one of a fuel pressure and a fuel flow rate of the second flow of pressurized fuel. The first and second flows of pressurized fuel are directed to a fuel injection system associated with a combustion chamber.

DETAILED DESCRIPTION

Figure 1:
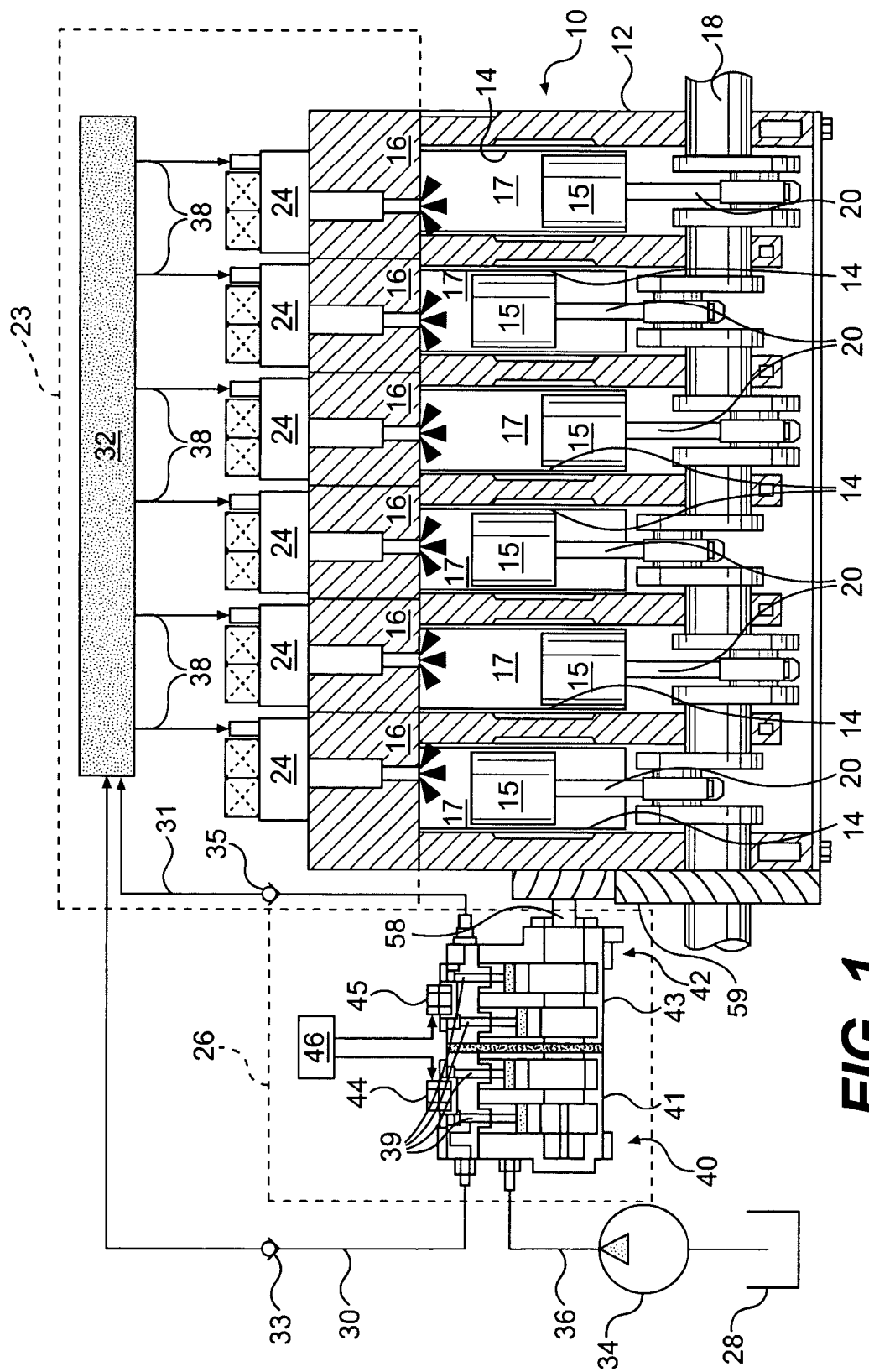
FIG. 1 is a schematic and diagrammatic illustration of an exemplary embodiment of an internal combustion engine having a fuel pumping system in accordance with the present disclosure.

An exemplary embodiment of an engine 10 is illustrated in FIG. 1. For the purposes of this disclosure, engine 10 is depicted and described as a four-stroke diesel engine. One skilled in the art will recognize, however, that engine 10 may be any other type of internal combustion engine such as, for example, a gasoline or natural gas engine.

As illustrated in FIG. 1, engine 10 includes an engine block 12 that defines a plurality of cylinders 14. A piston 15 is slidably disposed within each cylinder 14. Engine 10 may also include a cylinder head 16 associated with each cylinder 14.

Cylinder 14, piston 15, and cylinder head 16 form a combustion chamber 17. In the illustrated embodiment, engine 10 includes six combustion chambers 17. One skilled in the art will readily recognize that engine 10 may include a greater or lesser number of combustion chambers 17 and that combustion chambers 17 may be disposed in an "in-line" configuration, a "V" configuration, or any other conventional configuration.

As also shown in FIG. 1, engine 10 includes a crankshaft 18 that is rotatably disposed within engine block 12. A connecting rod 20 connects each piston 15 to crankshaft 18. Each piston 15 is coupled to crankshaft 18 so that a sliding motion of piston 15 within the respective cylinder 14 results in a rotation of crankshaft 18. Similarly, a rotation of crankshaft 18 will result in a sliding motion of piston 15.

Engine 10 may also include a fuel injection system 23 having a series of fuel injection units 24 disposed within each cylinder head 16 and associated with combustion chambers 17. Each fuel injection unit 24 is operable to inject an amount of pressurized fuel into combustion chamber 17 at predetermined fuel pressures and fuel flow rates. Each fuel injection unit 24 may be mechanically, electrically, or hydraulically operated.

The timing of fuel injection into combustion chamber 17 may be synchronized with the motion of piston 15. For example, fuel may be injected as the piston 15 nears a top-dead-center position in a compression stroke to allow for compression-ignited-combustion of the injected fuel. Alternatively, fuel may be injected as the piston 15 begins the compression stroke heading towards a top-dead-center position for homogenous charge compression ignition operation. Fuel may also be injected as the piston 15 is moving from a top-dead-center position towards a bottom-dead-center position during an expansion stroke for a late post injection to create a reducing atmosphere for aftertreatment regeneration.

As shown in FIG. 1, a fuel pumping system 26 may be operably connected to the engine 10 and driven by the crankshaft 18. The fuel pumping system 26 may be connected with crankshaft 18 in any manner readily apparent to one skilled in the art where a rotation of crankshaft 18 will result in a corresponding rotation of a pump drive shaft 58. For example, fuel pumping system 26 may be connected to crankshaft 18 through a gear train 59.

The fuel pumping system 26 may be adapted to draw fuel from a supply 28. Fuel pumping system 26 may be adapted to increase the pressure of the fuel and direct one or more pressurized streams of fuel to fuel injection system 23. A fuel transfer pump 34 may be disposed in a fuel line 36 between the supply 28 and the fuel pumping system 26 and configured to provide low pressure feed to fuel pumping system 26.

Fuel pumping system 26 may include a first pumping element 40 operably connected to pump drive shaft 58 and a second pumping element 42 operably connected to pump drive shaft 58. In the embodiment of FIG. 1, first pumping element 40 is disposed in a first pump housing 41 and second pumping element 42 is disposed in a second pump housing 43. Alternatively, first and second pumping elements 40, 42 may be disposed within the same pump housing.

Each of the first and second pumping elements 40, 42 may be adapted to generate a flow of pressurized fuel. For example, the first pumping element 40 may generate a first flow of pressurized fuel and the second pumping element 42 may generate a second flow of pressurized fuel. Each of the first and second pumping elements 40, 42 may be any type of pumping element such as, for example, an in-line piston pump having a series of pistons 39.

Each of the first and second pumping elements 40, 42 may include a control element that is adapted to vary at least one of a flow rate and a pressure of the respective flow of pressurized fuel. For example, each of the first and second pumping elements 40, 42 may be a hydraulically actuated, electronically controlled unit injector pump. First and second pumping elements 40, 42 may include a rotatable cam (not shown) adapted to drive the series of in-line pistons through a compression stroke to pressurize fuel. A plunger (not shown) may be closed at variable timings to change the length of the compression stroke and thereby vary the flow rate of the pumping element. Alternately, first and second pumping elements 40, 42 may include a rotatable swashplate, or any other means known in the art for varying the flow rate of pressurized fuel.

An actuating device, such as a solenoid, may be connected to each pumping element to govern the position of the control element to thereby control at least one of the flow rate and the flow pressure of the respective pumping element. A first solenoid 44 may be connected to the control element of the first pumping element 40 to cause it to produce a first fuel stream in response to a demand for a particular fuel pressure and/or a fuel flow rate. Likewise, a second solenoid 45 may be connected to the control element of the second pumping element 42 to cause it to produce a second fuel stream in response to a demand for a fuel pressure and/or a fuel flow rate. Fuel pumping system 26 may be operable to produce a range of fuel flow rates at a range of fuel pressures by selectively operating the first solenoid 44 and the second solenoid 45 to control the position of the respective control element and by selectively directing the pressurized fuel along various fuel paths, as will be described in greater detail below.

The fuel pumping system 26 may include a controller 46, adapted to control the first and second solenoids 44, 45. Controller 46 may include all the components required to run an application such as, for example, a memory, a secondary storage device, and a processor, such as a central processing unit. One skilled in the art will appreciate that the controller 46 can contain additional or different components. Furthermore, although aspects of the present disclosure may be described as being stored in memory, one skilled in the art will appreciate that these aspects can also be stored on or read from other types of computer program products or computer-readable media, such as computer chips and secondary storage devices, including hard disks, floppy disks, CD-ROM, or other forms of RAM or ROM. Associated with the controller 46 may be various other known circuits such as, for example, power supply circuitry, signal conditioning circuitry, and solenoid driver circuitry, among others.

Controller 46 may selectively control the first solenoid 44 and the second solenoid 45 to change the pressure and/or flow rate of each of the first and second flows of pressurized fuel in response to changing demands for fuel flow rate and fuel pressure. For example, controller 46 may control first and second solenoids 44, 45 to increase flow rates of the first flow and decrease flow rates of the second flow in response to HCCI operation of the engine 10 that requires reduced injection pressure. Controller 46 may energize second solenoid 45 to thereby increase the second flow rate for normal operation of the engine 10 that requires a higher fuel pressure. Alternatively, controller 46 may control first and second solenoids 44, 45 to increase flow rates of the first flow and decrease flow rates of the second flow for use during normal operation and energize second solenoid 45 to thereby increase the second flow rate for use during aftertreatment regeneration which requires incremental fueling in the form of late post injections to create a reducing atmosphere (oxygen-limited). Controller 46 may also selectively energize the first and second solenoids 44, 45 in response to a change in loading conditions of the engine 10.

Figure 2:
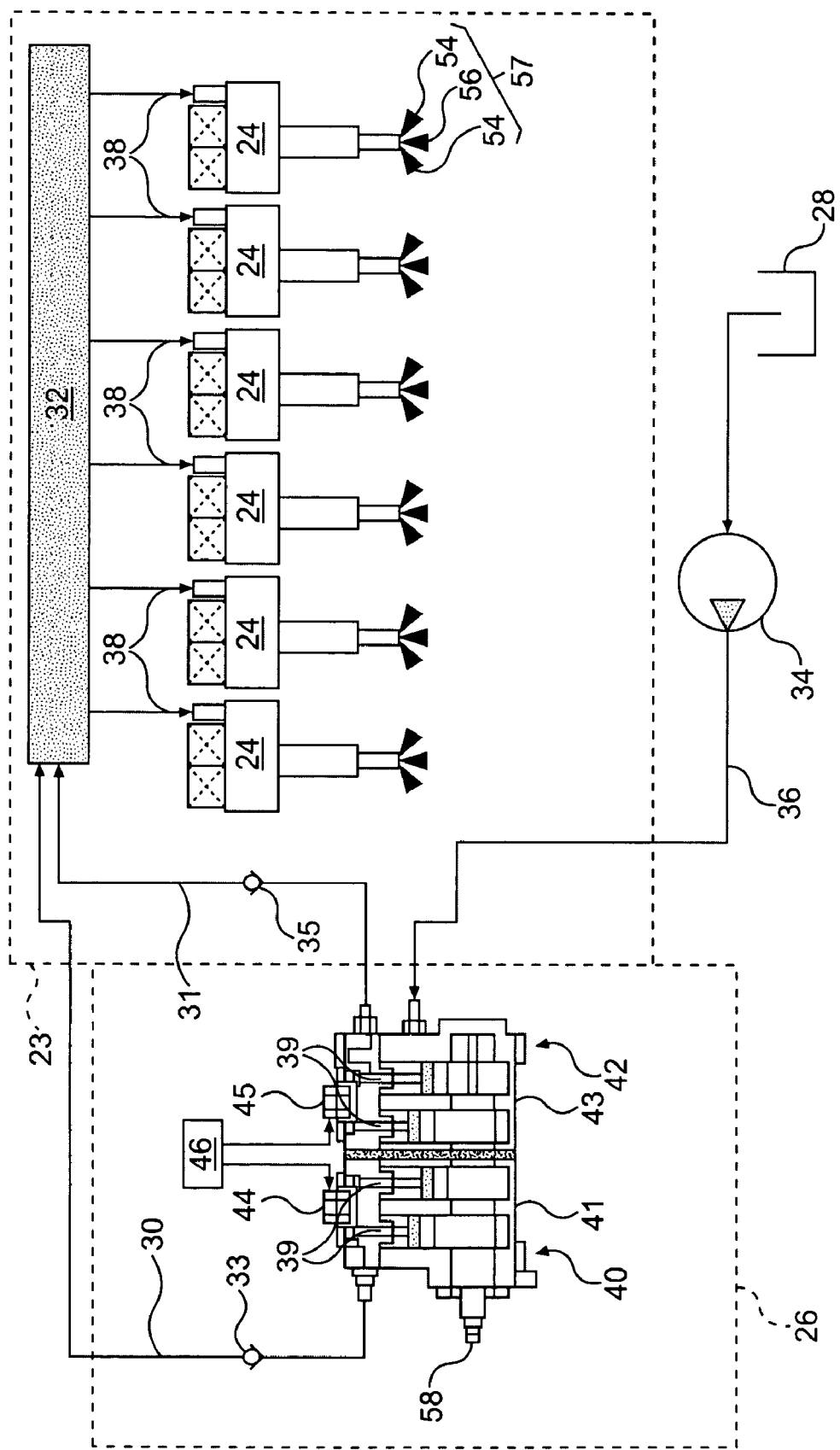
FIG. 2 is a schematic and diagrammatic illustration of a first exemplary embodiment of a fuel pumping system in accordance with the present disclosure.

As illustrated in FIGS. 1 and 2, the first and second pumping elements 40, 42 may be connected to a manifold 32 by way of fuel lines 30 and 31 respectively. Check valves 33 and 35 may be disposed within fuel lines 30 and 32 respectively. Manifold 32 may be connected to fuel injection units 24 by way of a plurality of fuel lines 38. In this manner, first and second pumping elements 40, 42 may be configured to operate in parallel, each drawing fuel from the same supply 28 and directing each respective pressurized flow of fuel to the same manifold 32.

In the embodiment of FIG. 2, first pumping element 40 may be operated to produce a first flow of pressurized fuel at a first flow rate and a first pressure, which may create a first spray plume pattern 54 when fuel injection unit 24 is actuated to inject a quantity of fuel from the manifold 32 into the combustion chamber 17. Additionally, second pumping element 42 may be simultaneously operated to produce a second fuel stream at a second flow rate depicted as spray plume 56. The first and second fuel streams may be combined in the manifold 32, thereby increasing the total fuel flow rate and/or pressure to create a second spray plume pattern 57 when fuel injection unit 24 is actuated.

Figure 3:
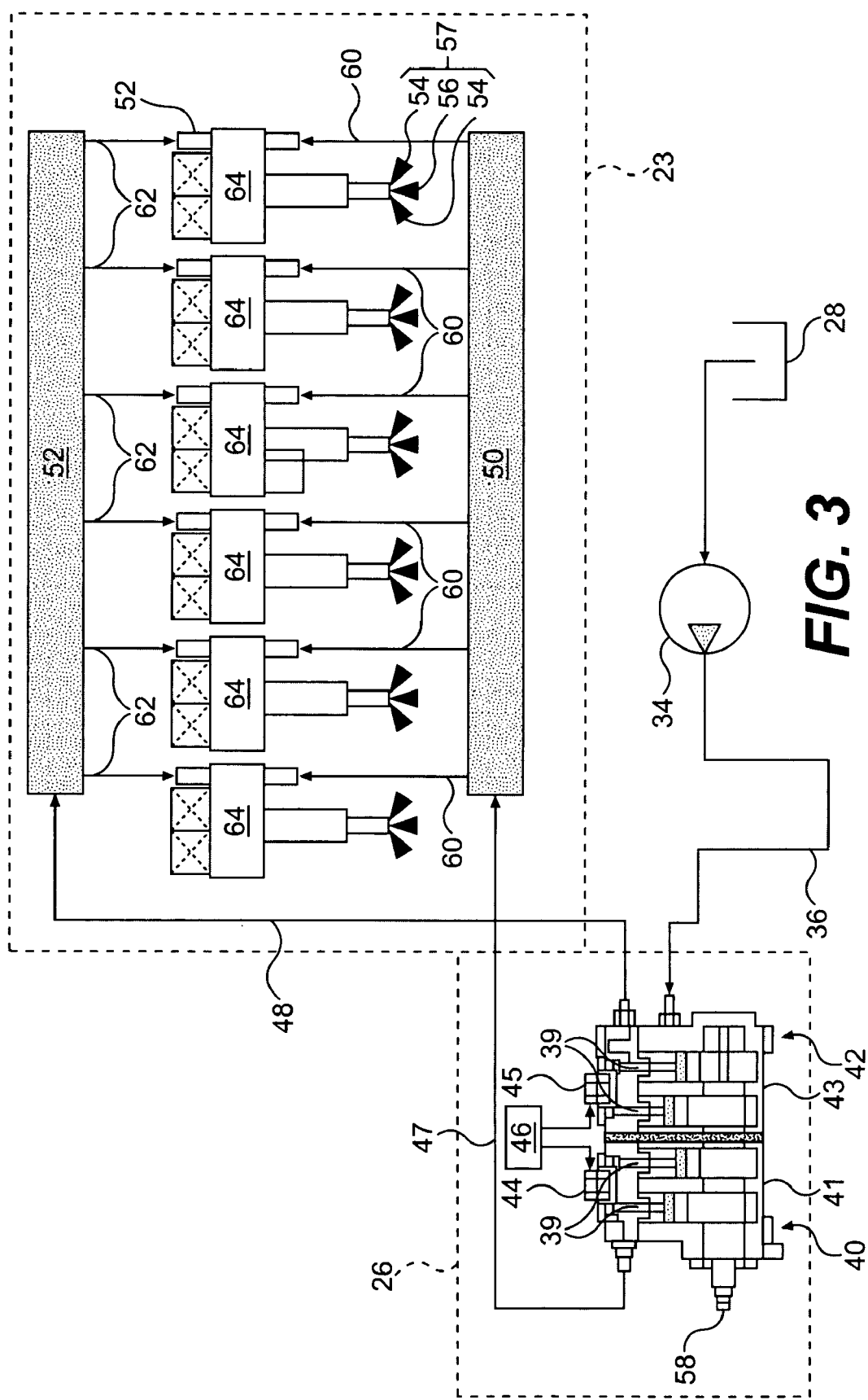
FIG. 3 is a schematic and diagrammatic illustration of a second exemplary embodiment of a fuel pumping system in accordance with this disclosure.

As shown in FIG. 3, fuel injection system 23 may include multiple fuel manifolds that supply fuel to a fuel injection unit 64. A first manifold 50 may be connected to fuel injection unit 64 through a plurality of fuel lines 60. A second manifold 52 may be connected to fuel injection unit 64 through a plurality of fuel lines 62.

Controller 46 may energize first solenoid 44 to actuate first pumping element 40 to produce a first stream at a first flow rate and a first pressure. The first stream may be directed to first manifold 50 by way of a fuel line 47. Controller 46 may energize second solenoid 45 to actuate second pumping element 42 to produce a second fuel stream at a second flow rate and a second pressure. The second stream may be directed to second manifold 52 by way of a fuel line 48.

The fuel injection unit 64 may be adapted to simultaneously receive the first and second streams of fuel. Fuel injection unit 64 may be operated to inject the fuel from one of the first and second manifolds or both of the first and second manifolds 50, 52. In this manner, fuel injection unit 64 may selectively create a first spray plume pattern 54, a second spray plume pattern 56, and a third spray plume pattern 57 including the first and second spray plume patterns 54, 56 combined.

Figure 4:
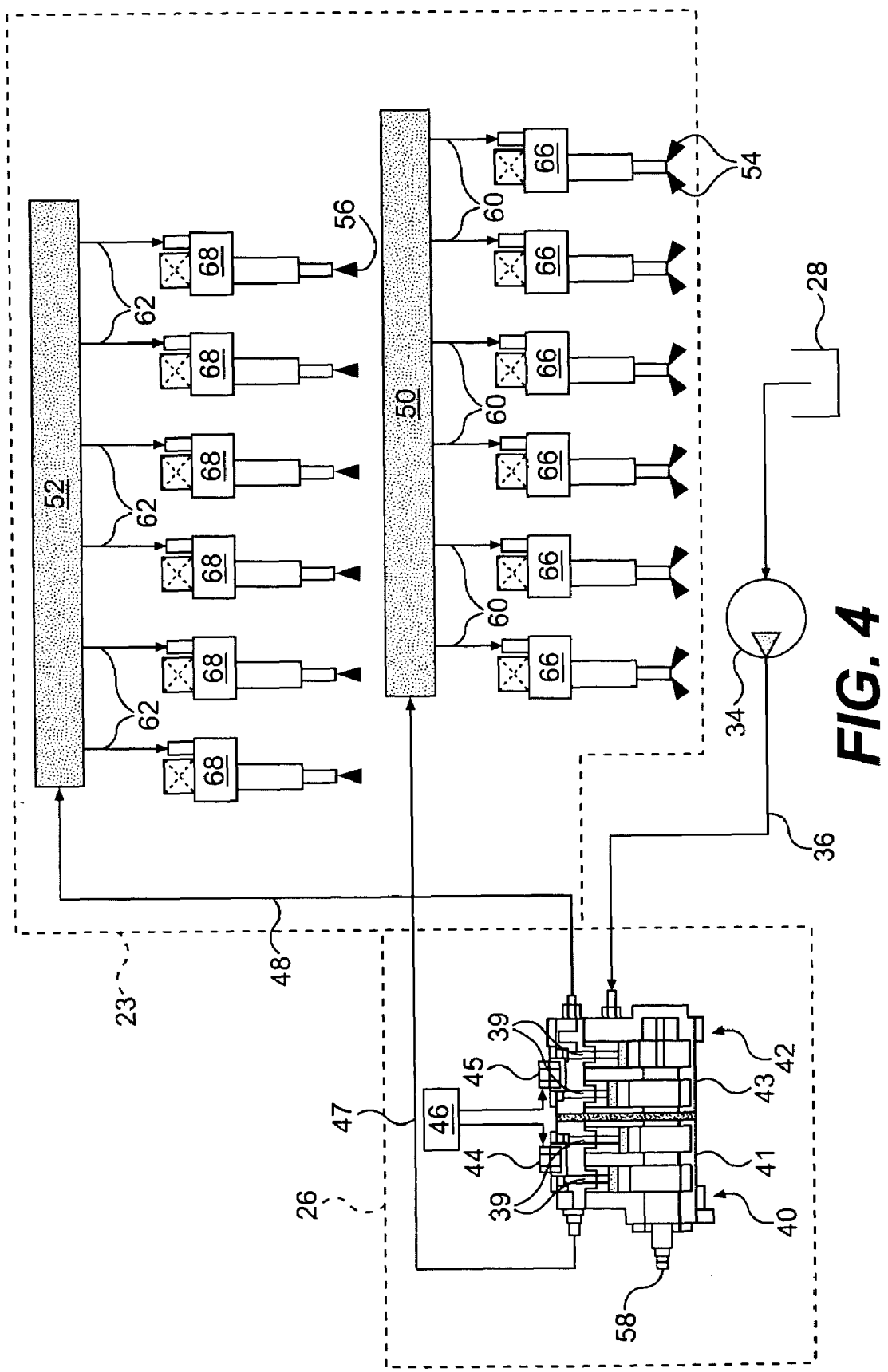
FIG. 4 is a schematic and diagrammatic illustration of a third exemplary embodiment of a fuel pumping system in accordance with the present disclosure.

In the embodiment of FIG. 4, fuel injection system 23 may include a first fuel injection unit 66 and a second fuel injection unit 68 associated with each combustion chamber 17 (referring to FIG. 1). First fuel injection unit 66 may be operable to inject fuel into combustion chamber 17 (referring to FIG. 1) having a first flow rate and a first injection pressure. Second fuel injection unit 68 may be operable to inject fuel into combustion chamber 17 (referring to FIG. 1) having a second fuel flow rate and a second injection pressure.

Controller 46 may energize first solenoid 44 to actuate first pumping element 40 and second solenoid 45 to actuate second pumping element 42 to produce the first and second fuel streams directed to first and second manifolds 50 and 52, of the fuel injection system 23, as described above. In the embodiment of FIG. 4, first manifold 50 is connected to first fuel injection unit 66 by way of fuel lines 60 and second manifold 52 is connected to second fuel injection unit 68 by way of fuel lines 62.

First fuel injection unit 66 may be selectively actuated to inject the first fuel stream to produce a first spray plume pattern 54. Second fuel injection unit 68 may be selectively actuated to inject the second fuel stream to produce a second spray plume pattern 56. The first fuel injection unit 66 and second fuel injection unit 68 may simultaneously inject the first and second fuel streams, producing the first and second spray plume patterns 54, 56.

INDUSTRIAL APPLICABILITY

The operation of engine 10 will cause a rotation of crankshaft 18, and corresponding rotation of pump drive shaft 58 that may cause an associated pumping action of first pumping element 40 and second pumping element 42. Controller 46 may energize first solenoid 44 to cause first solenoid 44 to actuate first pumping element 40 to produce a first fuel stream having a first flow rate at a first pressure.

Referring to the embodiment of FIGS. 1 and 2, the first fuel stream may be directed to fuel injection system 23 through a fuel line 30 to a manifold 32 and distributed to fuel injection units 24 through fuel lines 38. Fuel injection units 24 may inject the first fuel stream to produce a first fuel injection spray plume pattern 54 used for conventional combustion ignition operation of the engine 10.

As demand for fuel flow rate or pressure increases, such as during aftertreatment regeneration, controller 46 may energize second solenoid 45 to actuate second pumping element 42 to produce a second fuel stream having a second flow rate. This second fuel stream may be directed to fuel injection system 23 to join the first fuel stream supplied to fuel injection units 24. The combined fuel streams may increase the fuel flow rate and to produce a second injection spray plume pattern 57 when fuel injection unit 24 is actuated.

Operating the second pumping element only during times of increased fuel demand reduces the parasitic losses of the engine 10 during normal operation. This reduction in parasitic losses may improve the overall efficiency of the engine 10.

Referring to FIG. 3, the fuel pumping system 26 may also be used to simultaneously produce two streams of fuel having independent flow rates and pressures that are independently delivered to fuel injection units 64 of fuel injection system 23. Fuel pumping system 26 may cause first solenoid 44 to actuate first pumping element 40 to produce a first fuel stream having a first flow rate at a first pressure. This first fuel stream may be directed to fuel injection system 23 through a fuel line 47 to a manifold 50 and distributed to fuel injection units 64 through fuel lines 60. Fuel injection units 64 may inject the first fuel stream to produce a first fuel injection spray plume pattern 54 used for engine operation requiring low fuel flow rates and pressures such as, for example, homogeneous charge compression ignition.

As demand for fuel flow or pressure increases, fuel pumping system 26 may cause second solenoid 45 to actuate second pumping element 42 to produce a second fuel stream having a second flow rate at a second pressure. This second fuel stream may be directed through a fuel line 48 to a manifold 52 and distributed to fuel injection units 64 through fuel lines 62. Fuel injection units 64 may selectively inject the second fuel stream to produce a second injection spray plume pattern 56. Fuel injection units 64 may also simultaneously inject the first fuel stream and the second fuel stream to produce a third spray plume pattern 57. First, second, and third spray plume patterns 54, 56, 57 may also be used simultaneously and/or sequentially for conventional combustion and/or mixed mode combustion (i.e., homogeneous charge combustion and conventional combustion).

Referring to FIG. 4, the two streams of fuel from manifolds 50 and 52, described above, may be directed to two different sets of fuel injection units 66 and 68. Fuel injection units 66 and 68 may be selectively, sequentially, and/or simultaneously operated to produce variable injection spray plume patterns similar to the first and second spray plume patterns 54, 56 produced by fuel injection units 64 as described above.

The architecture of FIGS. 3 and 4 allow simultaneous provision of optimized fuel injection pressures for conventional combustion, homogeneous charge combustion, and/or mixed mode combustion processes.

The fuel system of the present disclosure has wide applications in a variety of engine types including, for example, diesel engines, gasoline engines, and natural gas engines. The disclosed invention may be implemented into any engine that utilizes a pressurizing fuel system. The described system may decrease engine exhaust emissions by providing a range of fuel flow rates at a range of pressures as demanded by various emission compliant engine operating cycles. The disclosed system may also increase the overall efficiency of the engine by only actuating the pumping means necessary to meet the immediate needs of the engine.

It will be apparent to those skilled in the art that various modifications and variations can be made in the fuel injection control system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the invention being indicated by the following claims and their equivalents.

What is claimed is:

1. A method of controlling a fuel system, comprising:
   operating a first pumping element to produce a first flow of pressurized fuel;
   operating a second pumping element to produce a second flow of pressurized fuel;
   selectively energizing a first solenoid to vary at least one of a fuel pressure and a fuel flow rate of the first flow of pressurized fuel;
   selectively energizing a second solenoid to vary at least one of a fuel pressure and a fuel flow rate of the second flow of pressurized fuel;
   directing the first and second flows of pressurized fuel to a fuel injection system associated with a combustion chamber;
   directing the first flow of pressurized fuel through a first manifold to a fuel injection unit; and
   directing the second flow of pressurized fuel through a second manifold to the fuel injection unit.

2. The method of claim 1, further including combining the first and second flows of pressurized fuel for injection into the combustion chamber.

3. The method of claim 1, further including operating the fuel injection unit to selectively inject the first and second flows of pressurized fuel into the combustion chamber.

4. A method of controlling a fuel system, comprising:
   operating a first pumping element to produce a first flow of pressurized fuel;
   operating a second pumping element to produce a second flow of pressurized fuel;
   selectively energizing a first solenoid to vary at least one of a fuel pressure and a fuel flow rate of the first flow of pressurized fuel;
   selectively energizing a second solenoid to vary at least one of a fuel pressure and a fuel flow rate of the second flow of pressurized fuel;
   directing the first and second flows of pressurized fuel to a fuel injection system associated with a combustion chamber;
   directing the first flow of pressurized fuel through a first manifold to a first fuel injection unit associated with the combustion chamber;
   directing the second flow of pressurized fuel through a second manifold to a second fuel injection unit associated with the combustion chamber; and
   actuating at least one of the first and second fuel injection units to inject one of the first and second flows of pressurized fuel into the combustion chamber.

5. A fuel pumping system for an engine having at least one combustion chamber, comprising:
   a fuel injection system associated with the at least one combustion chamber, the fuel injection system operable to inject an amount of pressurized fuel into the combustion chamber;
   a first manifold in fluid communication with the fuel injection system;
   a second manifold in fluid communication with the fuel injection system;
   a first pumping element adapted to direct a first flow of pressurized fuel through the first manifold to the fuel injection system; and
   a second pumping element adapted to direct a second flow of pressurized fuel through the second manifold to the fuel injection system.

6. The fuel pumping system of claim 5, wherein the fuel injection system includes a fuel injection unit adapted to selectively inject one of the first and second flows of pressurized fuel into the combustion chamber.

7. The fuel pumping system of claim 5, wherein the fuel injection system includes:
   a first fuel injection unit in fluid communication with the first manifold; and
   a second fuel injection unit in fluid communication with the second manifold.

8. An engine system, comprising:
   an engine block defining at least one combustion chamber;
   a pump drive;
   a first pumping element operatively connected to the pump drive and operable to produce a first flow of pressurized fuel;
   a second pumping element operatively connected to the pump drive and operable to produce a second flow of pressurized fuel;
   a first solenoid operatively connected to the first pumping element and operable to vary at least one of a fuel pressure and a fuel flow rate of the first flow of pressurized fuel;
   a second solenoid operatively connected to the second pumping element and operable to vary at least one of a fuel pressure and a fuel flow rate of the second flow of pressurized fuel;
   a fuel injection system operable to selectively inject the first and second flows of pressurized fuel into the at least one combustion chamber;

a first manifold providing fluid communication between the first pumping element and the fuel injection system; and a second manifold providing fluid communication between the second pumping element and the fuel injection system.

9. The engine system of claim 8, wherein each of the first and second pumping elements include a series of pistons.

10. The engine system of claim 8, wherein the fuel injection system includes a fuel injection unit adapted to selectively inject one of the first and second flows of pressurized fuel into the at least one combustion chamber.

11. The engine system of claim 8, wherein the fuel injection system includes:

a first fuel injection unit in fluid communication with the first manifold; and a second fuel injection unit in fluid communication with the second manifold.

12. The engine system of claim 8, wherein the first and second pumping elements are disposed in first and second pumping housings, respectively.

* * * * *